Oct. 7, 1941.                    R. E. HARRIS                    2,258,053
                              AXLE FOR TOY VEHICLES
                               Filed Jan. 3, 1938

Robert E. Harris

INVENTOR

Patented Oct. 7, 1941

2,258,053

UNITED STATES PATENT OFFICE 2,258,053

AXLE FOR TOY VEHICLES

Robert E. Harris, Ontario, Calif.

Application January 3, 1938, Serial No. 183,035

3 Claims. (Cl. 46—221)

This invention relates to axles for toy vehicles. The use in connection with which the invention was conceived is as an axle for the wheels of such things as toy automobiles made in whole or in part of rubber or the like.

The invention is illustrated in the accompanying drawing in which.

Toy automobiles, trucks, airplanes, etc., may be made from some soft, elastic substance, usually compounded rubber, and almost always called simply "rubber." The coming of such toys seemed a great boon both to parents relieved of worry and fears for floors and furniture, and to offspring released from oppressive restrictions upon the movement and maneuvering of toys. One great drawback has retarded what should, otherwise, be a well-nigh universal adoption of this type of toy. The wheels come off. A toy automobile without wheels is no more attractive to sonny than is a real one in the same fix to father. Either is junk. There has been need of something to keep the wheels on.

Manufacturers of rubber toys have struggled with this matter of wheels from the beginning, but, so far as I am aware, no satisfactory solution to this difficulty has been found prior to my invention.

The usual practice has been to put the wheels on with metal axles. In one construction a separate axle is used for each wheel, the axle then being pushed into a hole in the body of the toy. In another construction, one axle is used for each pair of wheels, the hole or opening for the axle, that is, the axle housing, being split along one side, longitudinally of the axle, so that the housing can be spread open and the axle slipped into place. These constructions are very subject to the coming out of the axles and the consequent loss of wheels in the normal rough and tumble use which an article like this usually gets, and they are helpless before the insistent pryings of inquisitive fingers.

I have now devised a construction which avoids these difficulties entirely. I accomplish this result by providing self-engaging axle members which hold the wheels in place. Accordingly an object of my invention is to provide and disclose an axle construction that will retain the wheels in a positive manner.

Another object of my invention is to provide and disclose an axle construction in combination with an axle housing of elastic material.

Still another object of my invention is to provide an axle comprised of a pair of substantially identical axle members.

A further object and advantage is attained by my construction by reason of its being inexpensive to manufacture and very simple to put together.

Other and further objects will appear more fully and at large herein and in the claims below, being, at least in part, understood through the use of the invention.

The principle of my construction will appear from an examination of the appended drawing.

Figure 1:
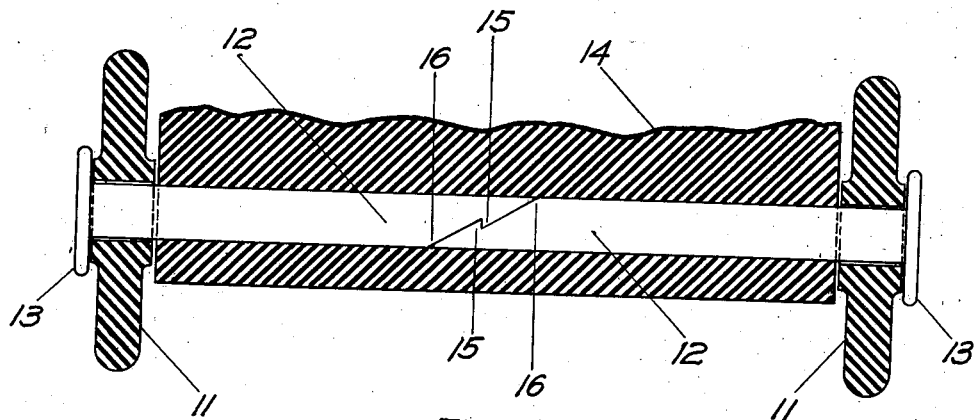
Figure 1 represents a section through one preferred construction.

Figure 1 represents a section through a portion of a toy automobile or the like, everything except the part immediately adjacent the wheels being broken away. In this embodiment, wheels 11, of elastic material if desired, are attached by means of axle members 12 having enlarged ends 13. These axle members are inserted in an opening or axle housing in the elastic body portion 14 of the vehicle. These axle members are preferably identical, for ease and cheapness of manufacture. They are made so as to be adapted for interlocking engagement as by being scarfed, i. e. by being provided with catch-portions 15. To prevent the pointed ends 16 from tearing or cutting into the body material when being inserted in the opening or axle housing, they may be made somewhat blunted. However, it is contemplated that the inner or engaging end may be formed so as to present three essentially plane surfaces.

Figure 2:
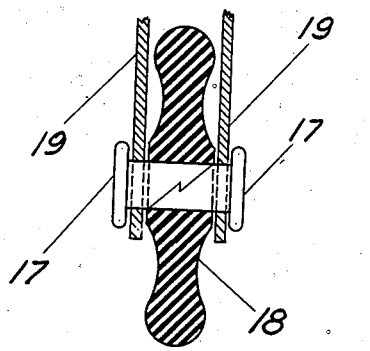
Figure 2 represents a section through a modified type of construction.

In the embodiment shown in Figure 2, the axle members 17, formed similarly to those shown in Figure 1, are illustrated in engagement within the opening or axle housing formed through the central portion of the wheel 18, which is of rubber or other elastic material and is shown supported between fork members 19, which in practice will ordinarily be of some more rigid material.

It will be seen at once that I have provided an axle construction which is very inexpensive to manufacture, which is very simple to put together, and which is relatively permanent. It will further be obvious from the foregoing description and from inspection of the accompanying drawing that in the construction shown and described the axle members are self-engaged in a single position only by which the wheels are never too tight and yet are not too loose. These characteristics are of the greatest importance from a practical standpoint.

Other modifications and changes, all within the spirit of my invention will occur to those skilled in the art. Therefore, I do not limit myself to the exact details of construction shown but only as indicated in the appended claims, and as necessitated by the prior art.

I claim:

1. In a wheeled toy, a portion formed of elastic material with a bore therein adapted to receive an axle, and an axle therein comprising members adapted for interengagement in one position only, the members having their engaging ends scarfed to become interlocked when held against lateral movement and being movable into engaged relationship by reason of the elasticity of said material and being thereby held in such engaged relationship within said opening.

2. In a wheeled toy, a portion of elastic material with a bore therein adapted to receive an axle, and an axle in said bore comprising members having their engaging ends scarfed to become interlocked when held against lateral movement and being movable into engaged relationship by reason of the elasticity of said material and being thereby held in such engaged relationship within said opening.

3. In a wheeled toy, a wheel of elastic material with a bore therein adapted to receive an axle, and an axle in said bore comprising members having their engaging ends scarfed to become interlocked when held against lateral movement and being movable into engaged relationship by reason of the elasticity of the material of said wheel and being thereby held in such engaged relationship within said opening.

ROBERT E. HARRIS.